T. FITZ E. HUTCHINGS.
VEHICLE WHEEL.
APPLICATION FILED MAY 26, 1913.
1,104,899.
Patented July 28, 1914.
2 SHEETS—SHEET 1.
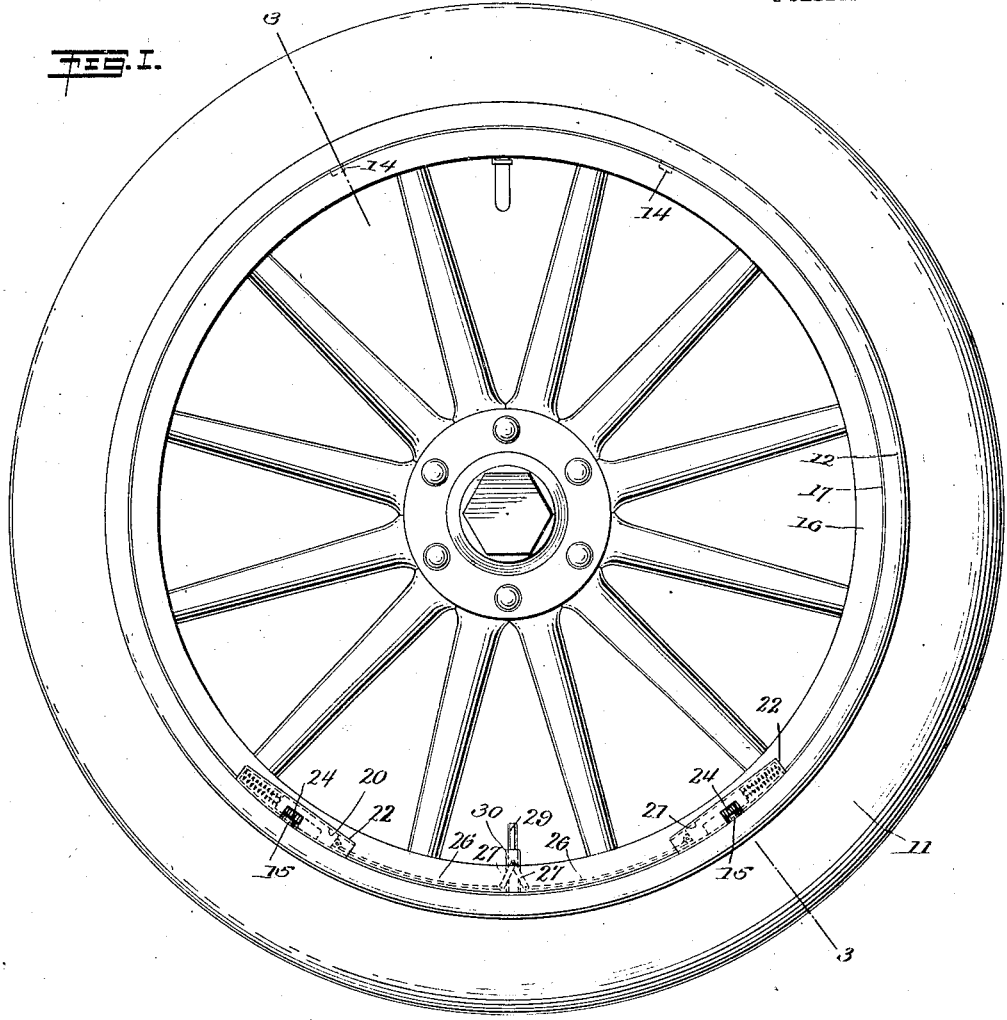
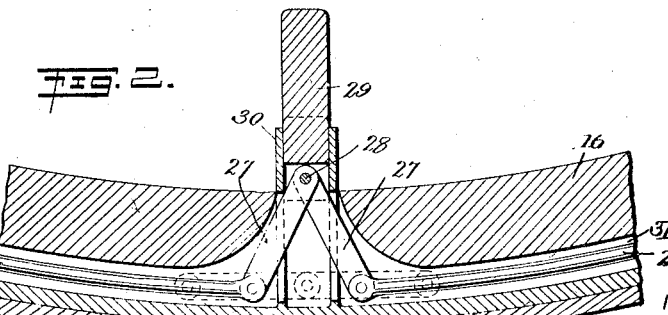
WITNESSES
G. Robert Thomas
E. F. Murdock
INVENTOR
Tresham Fitz Edgar Hutchings
BY Munn & Co
ATTORNEYS

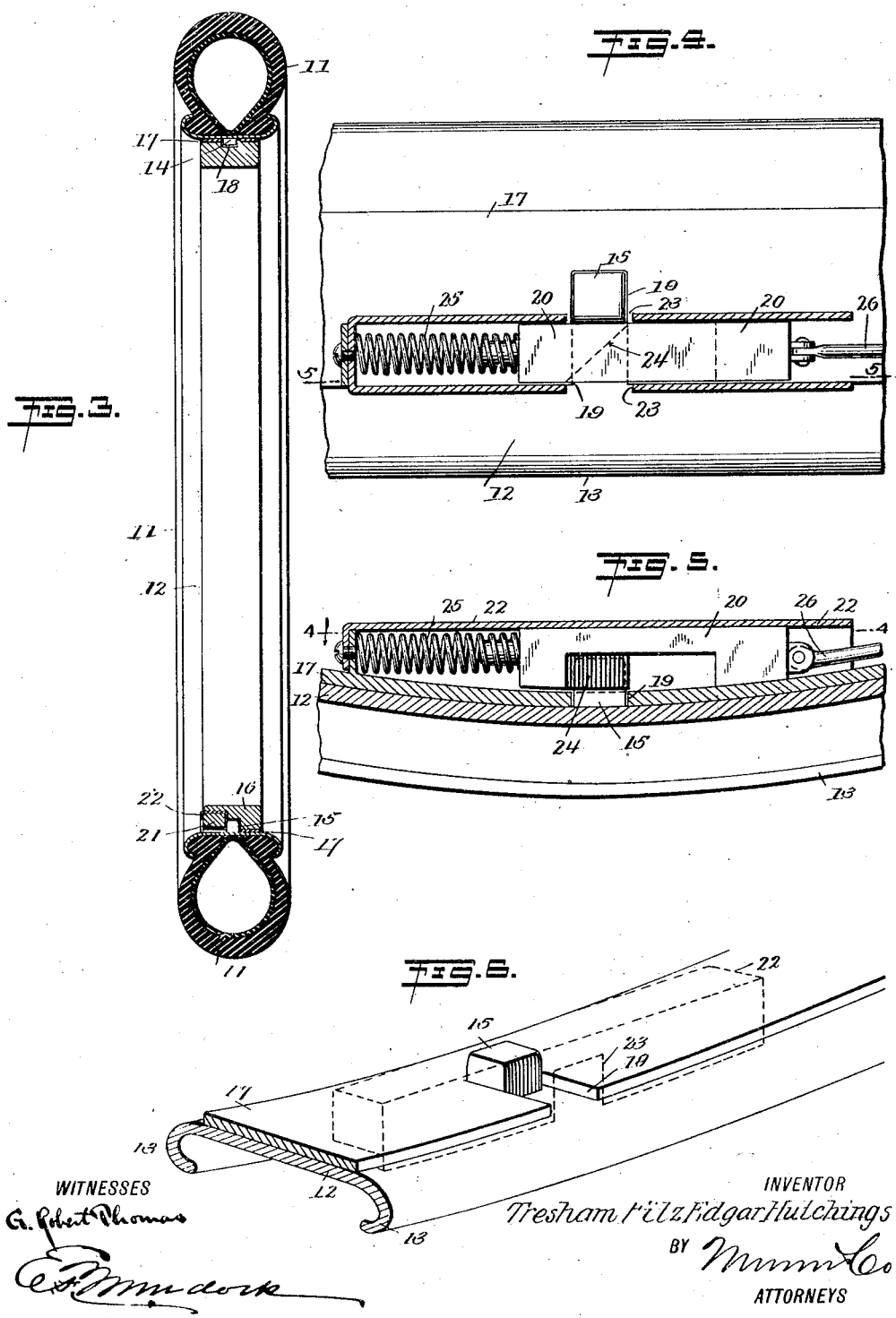

UNITED STATES PATENT OFFICE.

TRESHAM FITZ EDGAR HUTCHINGS, OF NEW YORK, N. Y.

VEHICLE-WHEEL.

1,104,899.  Specification of Letters Patent.  Patented July 28, 1914.

Application filed May 26, 1913. Serial No. 770,068.

*To all whom it may concern:*

Be it known that I, TRESHAM FITZ EDGAR HUTCHINGS, a subject of the King of Great Britain, and a resident of the city of New York, borough of Manhattan, in the county and State of New York, have invented a new and Improved Vehicle-Wheel, of which the following is a full, clear, and exact description.

Among the principal objects which the present invention has in view are: to provide a tire rim and tire removable from, and attachable to, the felly rim of a wheel; and to provide means for rapidly removing and replacing rims and tires of the character mentioned.

One embodiment of the present invention is shown in the accompanying drawings, in which—

Figure 1 is a side view of a wheel having a rim, tire and means for securing the same on the felly rim, constructed and arranged in accordance with the present invention; Fig. 2 is a detail view, on an enlarged scale, showing in vertical section means for releasing the locks employed for securing the rims, constructed and arranged in accordance with the present invention; Fig. 3 is a cross section of a wheel rim in conjunction with a tire and tire rim secured thereto, the section being taken as on the line 3—3 in Fig. 1; Fig. 4 is a detail view on an enlarged scale, partly in plan, showing the inner side of a fragment of a wheel felly rim and tire rim mounted thereon, the section being taken on the line 4—4 in Fig. 5; Fig. 5 is a vertical section taken on the line 5—5 in Fig. 4; Fig. 6 is a detail view in perspective, showing a fragment of a tire rim and a felly rim, constructed and arranged in accordance with the present invention.

As seen in the accompanying drawings, a pneumatic tire 11 is provided with a tire rim 12 of conventional shape in cross section. The rim 12 is a solid rim, having clencher lips of usual construction, and provided at suitable intervals and preferably on opposite sides of a diameter of the wheel, with dowels 14 and with lugs 15.

The felly 16 of a conventional wheel is furnished with a metal shoe or felly band 17. The felly band 17 is provided, in correspondence with the dowels 14 and the lugs 15, with sockets 18 and side opening slots 19, into the former of which the dowels 14 are placed endwise, and into the latter of which the lugs 15 are moved sidewise. The rim 12, in practice, fits closely on the band 17. If required, however, suitable wedges are used between the rim and band as in common practice. The rim 12 and tire carried thereby are prevented from dislodgment from the band 17 by spring-actuated locking bars 20 and 21. The locking bars 20 and 21 are slidably mounted in a housing 22, which is provided in the lateral sides thereof with cut-away portions forming opposite openings 23, through which the lugs 15 are passed when adjusting the tire rim and tire to a wheel. Each locking bar is provided with a beveled latch head 24. The bars 20 and 21 are normally moved to a position substantially as shown in Figs. 4 and 5 of the drawings, where the heads 24 extend across the opening 23 at the inner side of the housing 22 in the withdrawal path of the lugs 15. The locking bars 20 and 21 are normally held in the operative position above described by spiral springs 25 with which each is provided. From this position said bars are retracted to remove the heads 24 from said openings by connecting rods 26. The connecting rods 26 are suitably mounted in a bore 31 or groove, as the case may be, formed in the felly 16 and beneath the felly rim 17. The rods 26 extend between the bars 20 and 21, and are connected each with a toggle link 27. The links 27 are pivotally mounted by a pin 28, to a plunger 29. The plunger 29 is held in a guide tube 30 set in the felly 16, as best seen in Fig. 2 of the drawings. It will be seen, as shown in Fig. 2 of the drawings in dotted lines, that when the plunger 29 is depressed, the rods 26 are moved lengthwise of the bores 31 to force apart the bars 20 and 21 to contract the springs 25 and move the heads 24 of said locking bars from the paths of the lugs 15.

While I have in the accompanying drawings shown the construction as employing two dowels 14 and two lugs 15, it will be understood that I may augment or restrict the number of dowels and lugs to any reasonable degree without departing from the spirit of the present invention; and further, while I have herein shown a simple method and construction for spreading the locking bars 20 and 21 to release the lugs 15, other well known devices are considered by me as an equivalent for this construction, and may be employed without departing from the spirit of the invention.

The employment of the present invention is as follows: The tires 11 are mounted on the rims 12, and securely locked thereon, the tires being inflated to approximately service conditions. When, as sometimes happens on the road, a tire becomes punctured or is otherwise placed out of commission, it is removed quickly and easily by jacking the axle and wheel mounted thereon to free the same from the ground. The plunger 29 is then forced inward until the bars 20 and 21 are removed from the paths of the lugs 15. The chauffeur or operator then grasps the tire between said locking bars, to draw said tire sidewise from the wheel. The lugs 15 being unobstructed, pass freely through the openings 23, permitting the tire and rim connected therewith to clear the lower half thereof and allow the same to be lifted from the upper half of said wheel, the dowels 14 being thus lifted from and freed of the sockets 18. The auxiliary rim therefor with which a vehicle is usually supplied is then rapidly and readily adjusted in service position upon the wheel from which the former tire has been demounted. In so mounting the rim and tire, the steps in the operation are the reverse of those above described; to wit, the dowels 14 are first disposed in the sockets 18, and the tire, with its rim, is forced sidewise over the wheel and over the felly 16 and felly band 17 thereon. The lugs 15 enter the slots 19 and, if the plunger 29 has not been depressed, strike upon the inclined surfaces of the latch heads 24, to deflect said heads and the locking bars to permit the lugs 15 to pass to their resting places at the inner and closed ends of the slots 19. When the lugs 15 are so disposed, the springs 25 being unrestrained, force the bars into the normal or service position, as indicated in Figs. 4 and 5 of the drawings, the tire and rim being thereafter held firmly upon the wheel.

Claims.

1. A wheel, comprising a rigid felly having a series of full-sided sockets and a series of open-sided sockets disposed at opposite sides of the center of said felly; a pneumatic tire; a rigid rim for said tire, having a series of dowels to fit said sockets; a plurality of spring-actuated locks for holding said dowels within said open-sided sockets; a plurality of rods operatively connected with said locks, the ends of said rods being juxtaposed; and a manifolding member operatively connecting said rods to move the same simultaneously to release said locks.

2. A wheel, comprising a rigid felly having a series of full-sided sockets and a series of open-sided sockets disposed at opposite sides of the center of said felly; a pneumatic tire; a rigid rim for said tire, having a series of dowels to fit said sockets; a plurality of spring-actuated locks for holding said dowels within said open-sided sockets; a plurality of rods operatively connected with said locks, the ends of said rods being juxtaposed; a plunger reciprocatively mounted on said felly; and a plurality of toggle links pivotally connecting said plunger with said rods.

In testimony whereof I have signed my name to this specification in the presence of two subscribing witnesses.

TRESHAM FITZ EDGAR HUTCHINGS.

Witnesses:
 THOMAS WILSON,
 FRANK C. STEPHENS.

Copies of this patent may be obtained for five cents each, by addressing the "Commissioner of Patents, Washington, D. C."